United States Patent [19]

Tsui et al.

[11] Patent Number: 4,841,817
[45] Date of Patent: Jun. 27, 1989

[54] GUN DRILL COOLANT BUSHING AND METHOD OF MAKING SAME

[75] Inventors: Gary Tsui, Rosemead; Thomas Heimbigner, Bellflower, both of Calif.

[73] Assignee: CBC Industries, Inc., City of Commerce, Calif.

[21] Appl. No.: 203,630

[22] Filed: Jun. 6, 1988

Related U.S. Application Data

[63] Continuation of Ser. No. 928,201, Dec. 18, 1986, abandoned, which is a continuation-in-part of Ser. No. 725,102, Apr. 19, 1985, abandoned, and Ser. No. 895,477, Aug. 11, 1986, Pat. No. 4,770,570.

[51] Int. Cl.⁴ .................................................. B21K 5/02
[52] U.S. Cl. ............................... 76/101 R; 76/108 T; 408/61
[58] Field of Search ............. 76/108 T, 108 R, 101 A, 76/101 R; 408/72 B, 241 B, 56, 57, 59, 60, 61

[56] References Cited

U.S. PATENT DOCUMENTS

| | | | |
|---|---|---|---|
| 819,756 | 5/1906 | Hellman et al. | 175/208 |
| 2,811,875 | 11/1957 | Cogsdill | 76/108 T |
| 3,555,935 | 1/1971 | Dorrenberg | 76/108 T |
| 3,874,808 | 4/1975 | Zaccardelli et al. | 408/56 |
| 4,588,334 | 5/1986 | Khurana | 408/61 |

FOREIGN PATENT DOCUMENTS

| | | | |
|---|---|---|---|
| 515943 | 12/1952 | Belgium | 408/59 |
| 837794 | 2/1939 | France | 408/59 |

Primary Examiner—Z. R. Bilinsky
Attorney, Agent, or Firm—Beehler, Pavitt, Siegemund, Jagger, Martella & Dawes

[57] ABSTRACT

A lock collar for a drill bushing and a system for cooling a drill bit during a drilling operation are arranged so as to be incorporated into a single mechanism. The mechanism involves two assemblies, one being a locking liner embedded in a jig plate, and the other being a coolant directing assembly adapted to be mounted on a power-fed tool. There is coolant passage means in the coolant directing assembly which accepts coolant from an appropriate source and directs it through the first mentioned assembly to the cutting edge of the drill bit or other cutting tool while the cutting operation is taking place. By reverse rotation of the coolant directing assembly, that assembly can then be removed for subsequent engagement with another locking liner. Various structures and methods of manufacture are employed for forming the coolant passage means.

15 Claims, 5 Drawing Sheets

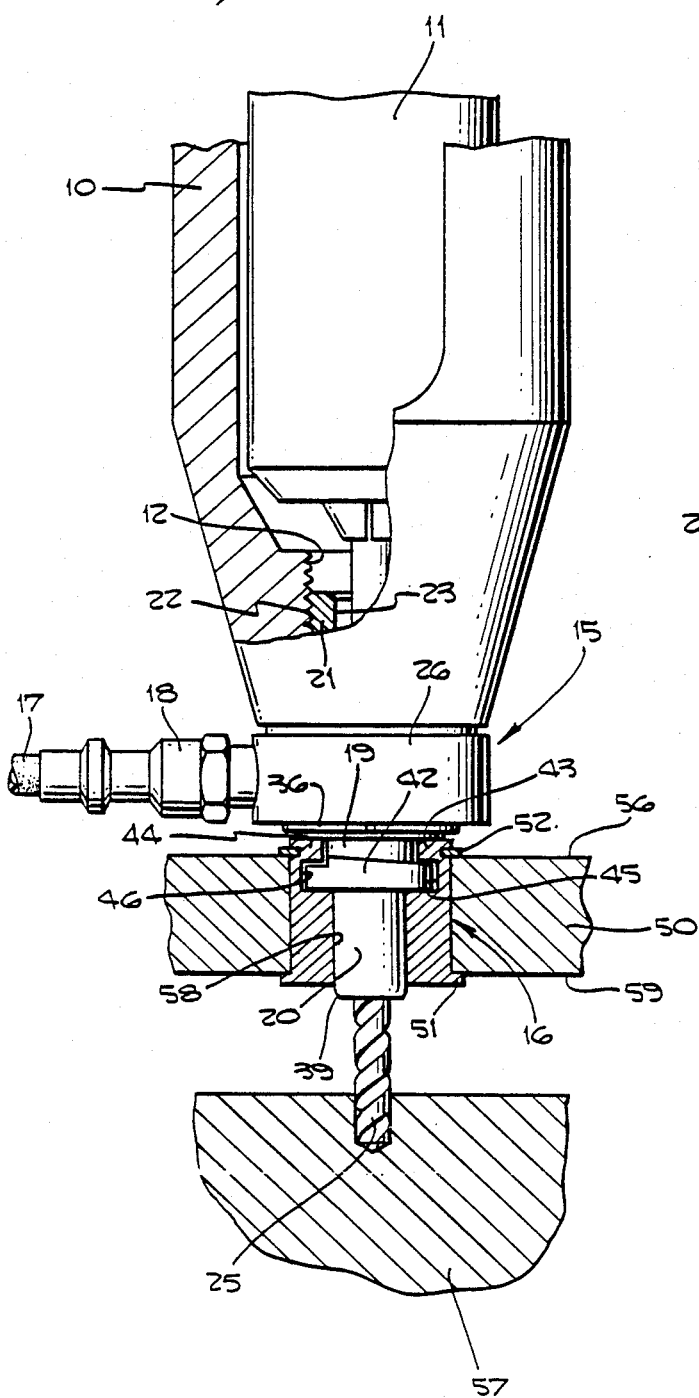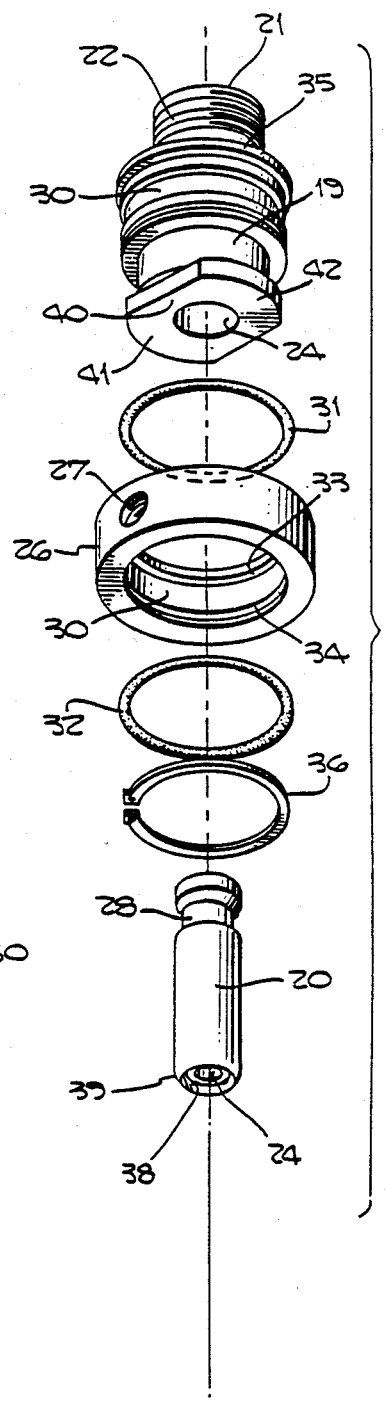

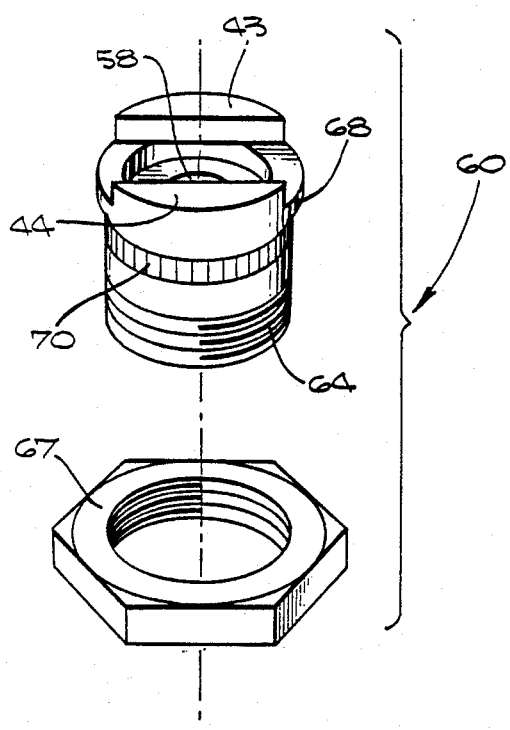
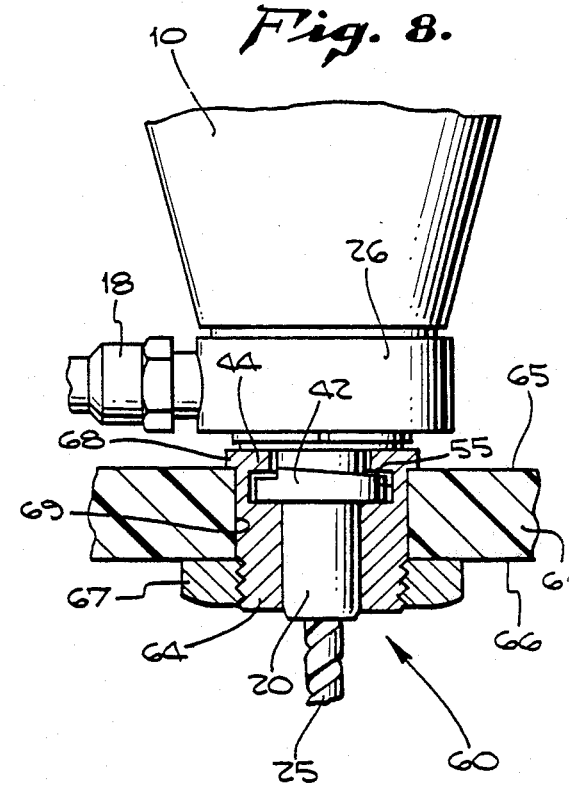
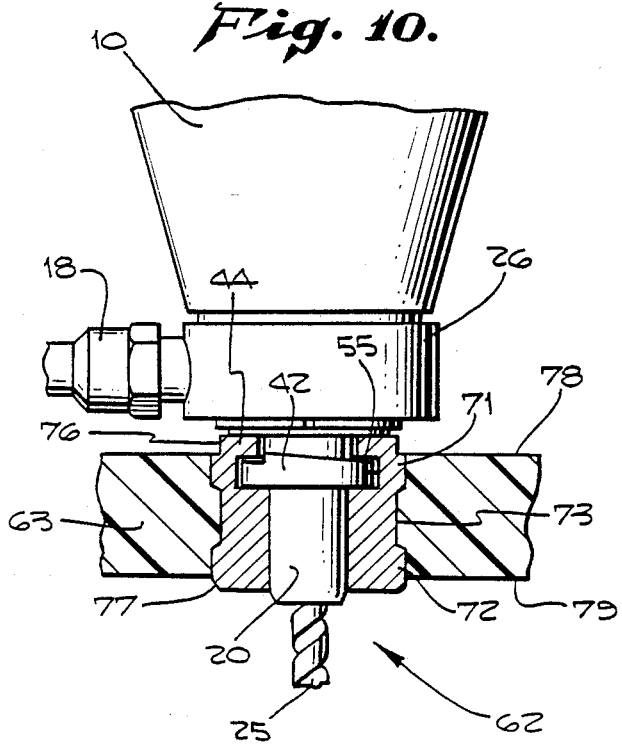
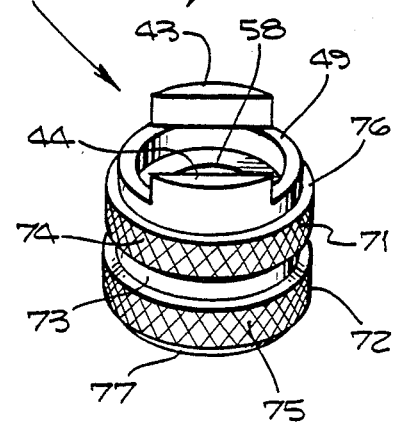

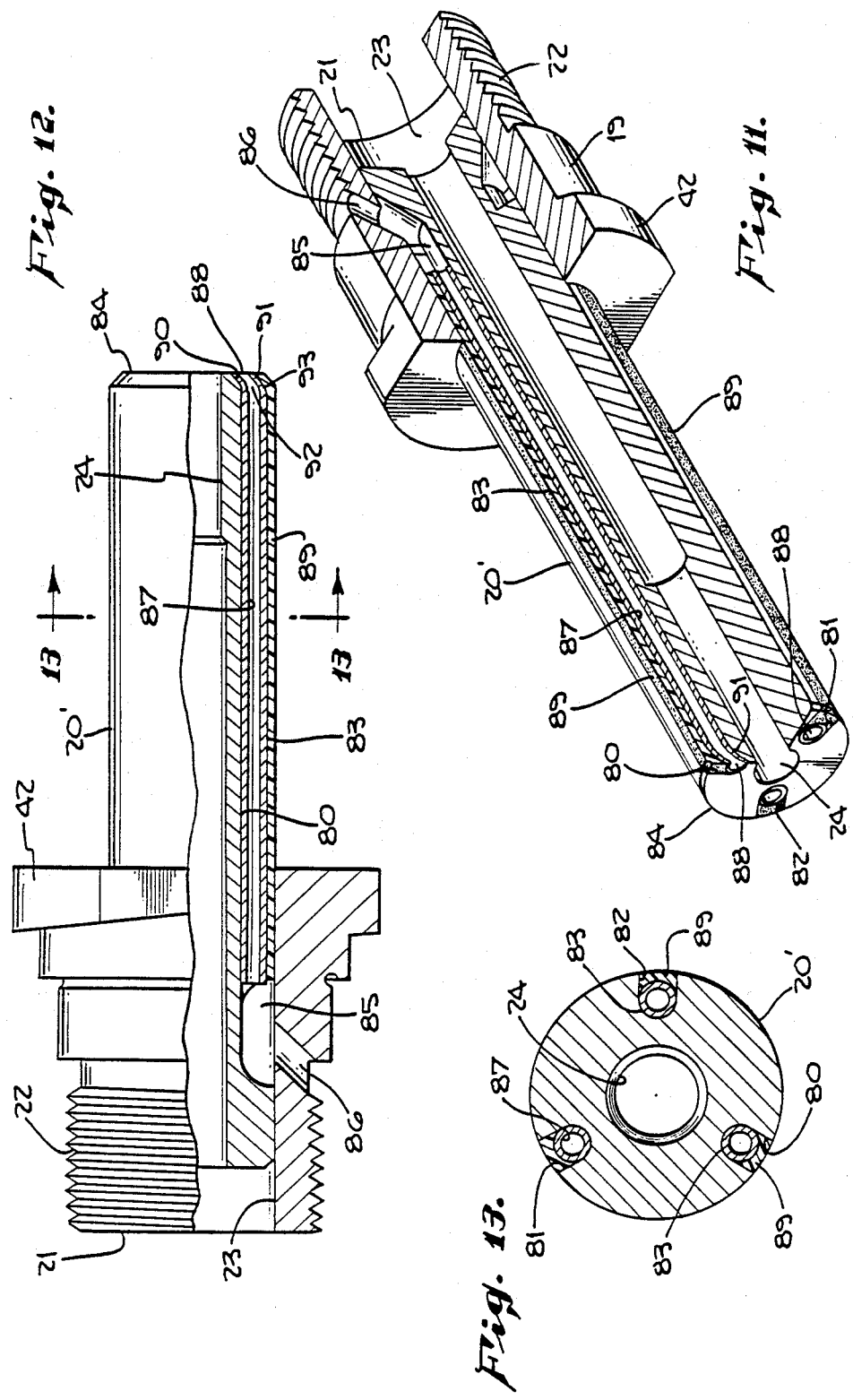

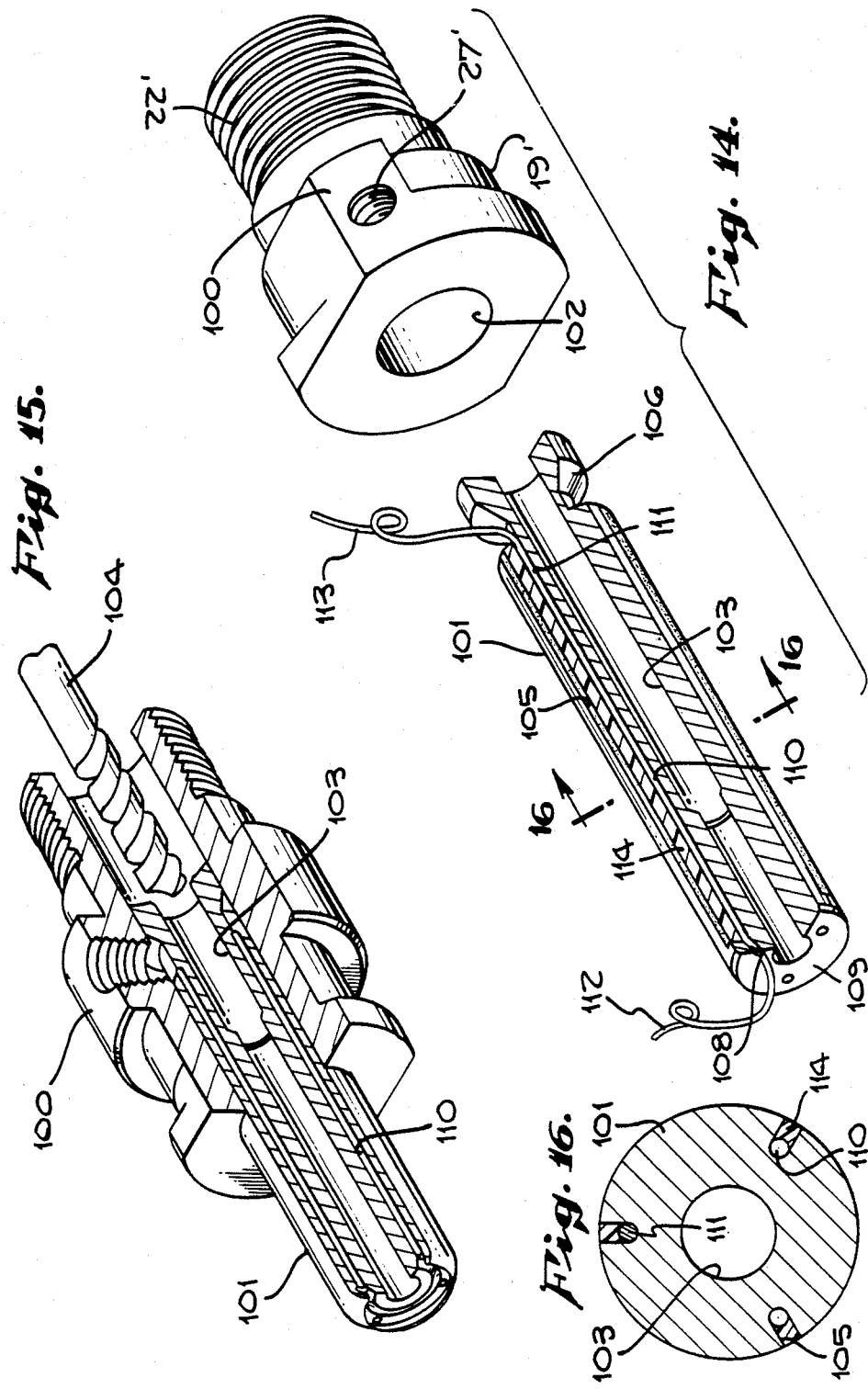

GUN DRILL COOLANT BUSHING AND METHOD OF MAKING SAME

This is a continuation of Ser. No. 928,201, now abandoned, which is a continuation-in-part of co-pending applications Ser. No. 725,102, filed Apr. 19, 1985, abandoned and Ser. No. 895,477, filed Aug. 11, 1986, U.S. Pat. No. 4,770,570.

One form of the invention here involved has reference to a drill bushing of the type where one part is stationarily mounted as on a drill jig, and the other part portably mounted upon the power tool, the portable part being provided with coolant passages to direct a coolant liquid from an appropriate source to the tool where the cutting edge of the tool is in engagement with the workpiece. There is a special arrangement of coolant passages in the portable part attached to the power tool which is such that the coolant passes entirely within the stationary part without the need for any portion of the coolant passages to be in the stationary part. The movable part is of such character that it can be reversed into disengagement from the stationary part and thereafter immediately directly driven into engagement with a succeeding stationary part at a different location.

In a simpler form of the invention there is a method applicable to construction of the coolant passages which adds appreciably to economy in the manufacturing process.

Drill Bushings have been widely used in various applications to radially and axially guide drills and reamers. Various existing bushing designs have been proposed to improve cutting efficiency. In the metal working industries, applying coolant to the cutting tool in a proper place has become critical in most drilling and reaming operations. Accordingly, addition of a coolant port on the portable part of the device should be one to allow passage of liquid coolant directly through appropriate orifices of the bushing shank directly to the cutting edge of the tool. It is also important to have the functioning parts quickly engageable and re-engageable so that the operation can be shifted from one location to another without delay in the manufacturing process on those occasions where portability may be a factor.

It is therefore among the objects of the invention to provide a new and improved coolant device for portable power feed drills which provides an appropriate continuous flow of coolant directly to the cutting edge of the tool.

Another object of the invention is to provide a new and improved coolant device for drill bushings of a character such that the coolant is fed constantly to the workpiece, whereby to serve also as a lubricating fluid to help dissipate friction heat and to extend tool life.

Further among the objects of the invention is to provide a new and improved coolant device for portable power-fed cutting tools comprising cooperating parts, one of which being a relatively simple structure, can be mounted on the power-fed tool and readily shifted from one stationary structure to another.

Still another object of this invention is to provide a new and improved coolant device comprising cooperating parts wherein one of such parts is a relatively simple jig mounted structure and the other is a portable structure carrying all of the lubricant passages in an arrangement wherein the portable structure passes coolant through the stationary structure directly to the cutting edge of the tool, the direction of flow being a function of the portable structure.

Also included among the objects of the invention is to provide a new and improved coolant device of portable character wherein the attachment to the coolant supply line provides a 360 degree swivel so that the tool and associated parts can be oriented in any direction with respect to the work.

Included further among the objects of the invention is to provide a new and improved efficient and dependable portable coolant device capable of directing a continuous flow of coolant to the cutting edge sufficiently well directed so that the force of the coolant flow is capable of forcing chips away from the workpiece, together with an effective and relatively inexpensive expedient for forming the coolant passage means.

The objects include also such a coolant device capable of constant feed of coolant to the cutting edge in order to dissipate heat and accordingly extend the tool life, the coolant being made to serve as a lubricant whereby galling is reduced, as is also the dulling effect on the cutting edge of the tool, the result of which is an increase in surface finish and reduction in rejection rates in addition to adding to tool life.

With these and other objects in view, the invention consists of the construction, arrangement, and combination of the various parts of the device serving as examples of various embodiments of the invention, whereby the objects contemplated are attained, as hereinafter disclosed in the specification and drawings, and pointed out in the appended claims.

In the drawings:

FIG. 1 is a side elevational view of the device with parts partially in section shown assembled and in a position guiding a drill bit into engagement with a workpiece.

FIG. 5 is an exploded view of parts of the portable portion of the device.

FIG. 7 is an exploded perspective view of a second form of stationary subassembly.

FIG. 8 is a vertical sectional view of the subassembly of FIG. 7 mounted in a jig plate.

FIG. 9 is a perspective view of still another form of stationary subassembly.

FIG. 10 is a vertical sectional view of the subassembly of FIG. 9 mounted in a molded jig plate.

FIG. 11 is a side perspective view of a modified form of the device partially broken away to show interior construction.

FIG. 12 is a side elevational view of the form of FIG. 11 partially broken away.

FIG. 13 is a cross-sectional view taken on the line 13—13 of FIG. 12.

FIG. 14 is a side perspective exploded view of another modified form of the device partially broken away to show a step of the method.

FIG. 15 is a side elevational view of the device of FIG. 14 partially broken away to show a finished product.

FIG. 16 is a cross-sectional view on the line 16—16 of FIG. 14.

Figure 2:
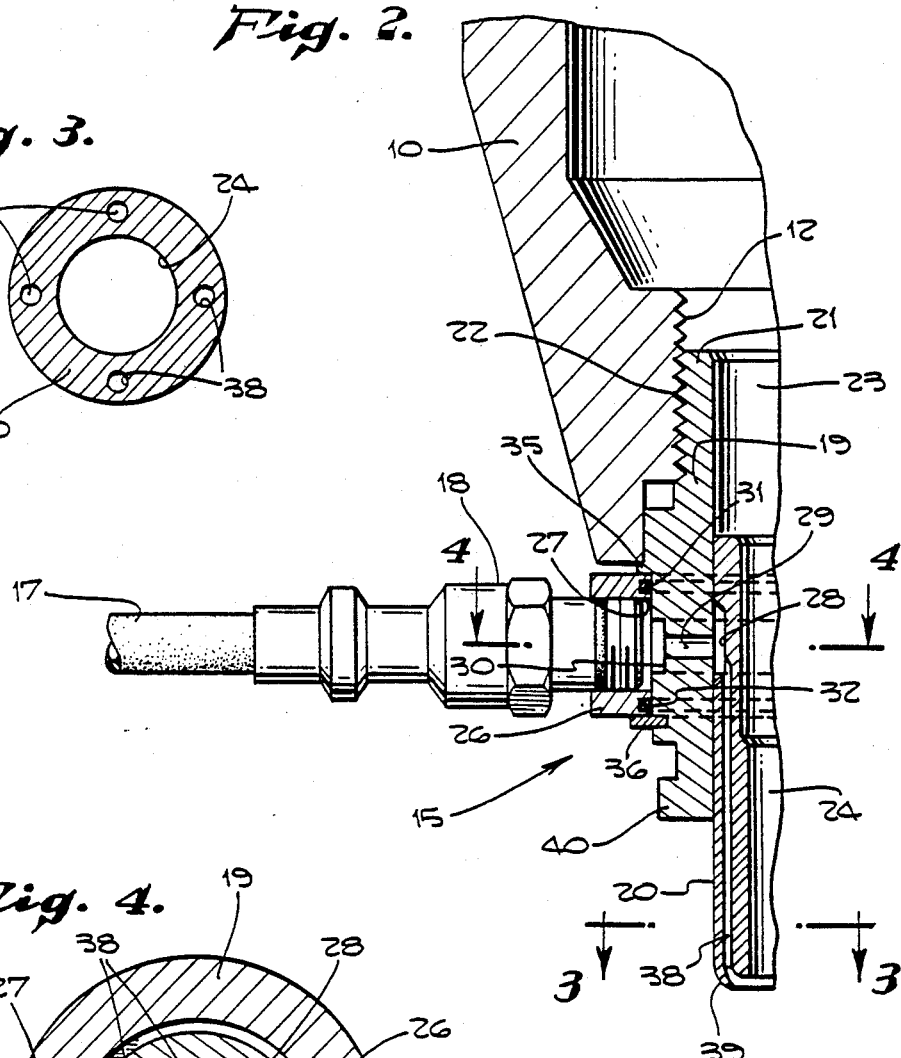
FIG. 2 is a fragmentary longitudinal sectional view taken through the portable assembly portion of the device.
Figure 3:
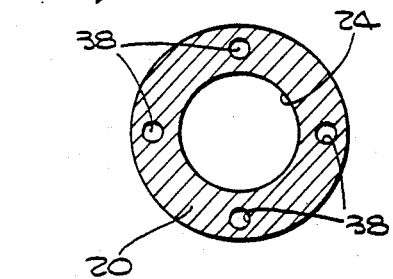
FIG. 3 is a cross-sectional view on the line 3—3 of FIG. 2.
Figure 4:
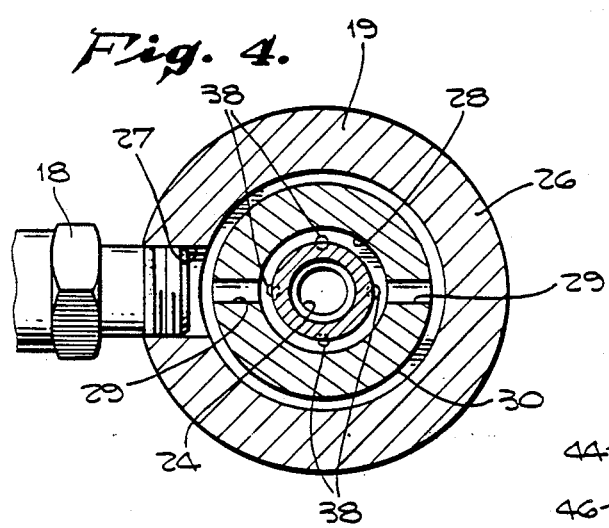
FIG. 4 is a cross-sectional view on the line 4—4 of FIG. 2.

In one embodiment of the invention chosen for the purpose of illustration there is shown a case 10 of a conventional power actuated tool in which is located for rotation a conventional three-jaw chuck 11. At the lower end of the case is an interiorly threaded opening 12 adapted for engagement with the coolant handling device comprising the invention.

There are two significant parts for the coolant handling device, one being a portable coolant directing assembly indicated for convenience by the reference character 15. The second part is a stationary subassembly indicated for convenience by the reference character 16. The exploded view of FIG. 6 pictures elements comprising the coolant directing assembly 15. A flexible supply line 17 brings liquid coolant to a conventional fitting 18, one element of which engages the coolant directing assembly 15 so as to feed liquid coolant to the assembly.

The coolant directing assembly 15 includes a body 19 in which is mounted a bushing shank 20. An upper extension 21 of the body is provided with an exterior thread 22 for engagement with the interior threaded opening 12 of the case 10, whereby to mount the coolant directing assembly 15 on the power tool. By virtue of this feature the coolant directing assembly 15 becomes in effect temporarily a part of the portable power tool.

A tool passage 23 in the body 19 leads directly into a counterbore 24, the counterbore 24 being for accommodation of a cutting tool such as the drill bit 25.

Extending around the body 19 is a coolant sleeve 26 which is actually that part of the coolant directing assembly 15 to which the fitting 18 is attached for introduction of the coolant. An entry port 27 in the coolant sleeve accommodates the fitting 18. A coolant distributing groove 28 on the exterior of the shank 20 accepts coolant from the two coolant holes 29 in turn fed from the annular recess 30 on the interior of the coolant sleeve 26.

For sealing the sleeve there are provided O-rings 31 and 32 which fit in appropriate O-ring grooves 33 and 34. The coolant sleeve 26 is held in place against a collar 35 by employment of a snap ring 36 in its groove on the exterior of the body 19.

Coolant is conducted from the coolant distributing groove 28 through a series of coolant bores 38 which in the chosen embodiment number two. It is of consequence to note that there is provided a rolled tip 39 at the outer end of the shank 20 for the purpose of deflecting coolant angularly inwardly toward the counterbore 24 and consequently the drill bit 25 and its cutting edge as coolant emerges from the coolant bores 38.

At the end of the body 19 is a flange 40 having opposite projections 41 and 42, and projections on their inner faces being milled at a helix angle for ultimate coupling to the stationary subassembly 16.

To accept the projections 41 and 42 the stationary subassembly is provided with oppositely located locking flanges 43 and 44, the locking flanges being provided respectively with slots 45 and 46 for reception respectively of the locking projections 41 and 42. Cutouts 48 and 49 in the stationary subassembly provide spaces between the locking flanges 43 and 44 for reception of the projections 41 and 42 of the body 19. Engagement of the portable assembly exemplified by the body 19 and bushing shank 20, with the stationary jig plate 63 is facilitated by flexibility of the supply line 17 and need for rotation of the body no more than about a half circle to accomplish the temporary interlock. In other words, the jig plate is fixed in position but the coolant assembly is not.

Figure 6:
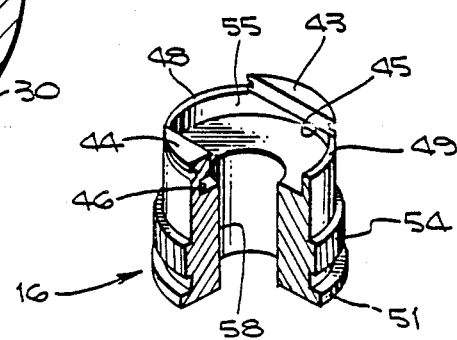
FIG. 6 is a perspective view partially cut away of the stationary portion of the device.

In actual practice there would in all probability be a multiple number of stationary subassemblies 16 used in a single jig plate 50. One form of these is shown in FIGS. 1 and 6 of the drawings. As shown, the stationary subassembly 16 is mounted in the jig plate 50, the jig plate being confined between a ferrule 51 on the body of the stationary subassembly and a snap ring 52 on the opposite side. Various conventional jig plates are available into which the stationary subassembly may be inserted as, for example, by a press fit assisted by the knurling 54. If the jig plate should chance to be of plastic, such as a plastic sheet, the stationary subassembly could be molded in its appropriate position.

It is of further consequence to note that an annular recess 55 in the stationary subassembly is at a location inwardly of a face 56 of the jig plate 50 so that when the coolant directing assembly is in engagement with the stationary subassembly, as shown in FIG. 1, the space between the jig plate and the coolant directing assembly is as small as is structurally practical.

When a drilling or other cutting operation is to be performed, coolant flow is initiated in the supply line 17 and the coolant directing assembly 15 moved downwardly so that the projections 41 and 42 are extended into the cutouts 48 and 49. When rotating power is applied to the chuck 11, the projections 41 and 42 engage the slots 45 and 46 in a manner such that the presence of the milled helix angle on the projections pulls the coolant directing assembly into snug engagement with the stationary subassembly as the drilling operation starts driving the drill bit into a workpiece 57. The bushing shank 20 is rotatably disposed in a guide bore 58 in the stationary subassembly.

As long as the cutting operation continues with the workpiece 57, coolant from the coolant bores 38 will be directed by the help of the rolled tip 39 angularly inwardly toward the axis of rotation of the tool 25 and, in particular, at the cutting edge so that the coolant not only cools the operation, serves as a lubricant for the cutting, but also serves to flush out the chips as they are cut from the workpiece.

After the cutting operation on the workpiece has been completed by reverse motion of the chuck 11, the projections 41 and 42 are disengaged from the slots 45 and 46. Thereafter the coolant directing assembly can be withdrawn from the stationary subassembly and then moved to another similar stationary subassembly at another location on the jig plate. If need be, coolant flow may be cut off during the transfer.

The stationary subassemblies may on occasions be varied to a degree as note subassembly 60 which is screw mounted in a jig plate and of fixed thickness and subassembly 62 which is adjusted to be molded in position in a plastic figure plate 63.

For the subassembly 60 there is an exteriorly threaded portion 64 of sufficient length to extend through the jig plate 61 of predetermined thickness from a face 65 adjacent the chuck to an outer face 66. A relative flat nut 67 engages the exteriorly threaded portion 64 and upon being drawn against the outer face 66 draws a flange 68 against the face 65, in that way to firmly anchor the subassembly 60 in position in the jig plate 61. While the exteriorly threaded portion is being drawn in a hole 69 in the jig 61, an annular serrated section 70 of the subassembly 60 is forced into engagement with the wall of the hole 69 to resist tendency of the subassembly 60 to rotate during operation.

For the subassembly 62 there is a somewhat varied exterior configuration in order for it to be securely contained in the plastic jig 63 by a molding procedure. An acceptable configuration is like that shown where inner and outer annular bands 71 and 72 respectively lie on opposite sides of an annular recess 73. The bands 71 and 72 preferably have roughened exterior surfaces 74 and 75 for being more securely embedded in the soft tooling of the molded plastic jig plate 63, thereby to resist rotation of the subassembly during operation.

Preferably also, outer edges of the bands 71 and 72 terminate in respective annular edges 76 and 77. In that way, the subassembly 62 presents a low profile in that neither end protrudes measurably beyond the respective surfaces 78 and 79 of the jig plate. The desired low profile mounting is also a feature of the subassembly 16 of the first described form of the invention. A comparable low profile is maintained for the subassembly 60, especially adjacent the face 65 of the jig plate. By keeping the exterior threaded portion 64 short for reception of the flat nut 67, the low profile is maintained adjacent the face 66.

To produce the form of invention of FIGS. 11, 12 and 13, three circumferentially spaced elongated coolant recesses 80, 81 and 82 are made in the bushing shank 20. Each of the coolant recesses is preferably cut through the cylindrical exterior surface of the bushing shank, radially inwardly to a depth in excess of the diameter of a tube 83. Each tube extends from a free end 84 of the bushing shank into engagement with an annular coolant distribution recess 85 adjacent to the opposite end. An obliquely disposed coolant inflow passage 86 supplies the distribution recess 85 from a location where it can be reached by coolant from the supply line 17, similar to the disclosure in the first form of the invention.

By making use of milled coolant recesses 80, 81 and 82, manufacturing problems may be effectively minimized as compared with those experienced, for example, by the operation called for in the first form of the invention where coolant bores 38 are drilled. The tubes 83, one of which is used in each of the recesses, provide coolant passageways 87 from the distribution recesses 85 to an outlet end 88. The tubes 83, designated micro tubes for some installation, may be of metallic material such as copper, aluminum, or metal compositions of other conventional nature. In the alternative, use may be made, for example, of an appropriate synthetic plastic resin material The essence of the improvement is in the provision of a preformed tube which is embedded in the recess. To anchor the tubes 83 in the corresponding recess resort may be had to an appropriate synthetic plastic resin material 89 in which the tube is embedded, after which the plastic material hardens. Other appropriate conventional bedding compounds may also be used. One found especially acceptable is that of a mixture of 50% epoxy resin and 50% powdered metal such as powdered steel. Whichever may be chosen it should be capable of being finally trimmed down to a level coincident with the exterior surface of the bushing shank 20.

In order to direct coolant outflow obliquely inward toward the axis of the counterbore 24, the innermost corner 90 of the recess may be beveled to make possible bending the corresponding end 91 of the tube obliquely inwardly. The direction of the bend may be varied depending on the coolant flow desired. It may also be desirable to reduce the inside diameter 92 of the tube at the outflow end to provide, in effect, a nozzle 93.

As an alternative to produce that form of the invention shown in FIGS. 15, 16 and 17, a multiple number of coolant passages are found to be preferable, here illustrated as being three. There is shown by way of example a more simple form of body 19' equipped with the customary exterior thread 22' for engagement with the tool. A stationary boss 100 accommodates a threaded entry port 27' for attachment of a coolant supply line (not shown).

On this occasion a shank 101 has a fixed position in a cylindrical passage 102 through the body 19'. The shank accommodates an axial counterbore 103 for reception of a tool 104.

To form each of the coolant passages, numbering three in the chosen embodiment, a recess 105 is cut in the outside wall of the shank extending from an annular coolant distributing groove 106 at the captive end of the shank to a location adjacent the free end. A wall 107 of shank material is left at the free end of the shank. To provide an outlet, a hole 108 is made, usually by drilling from an end face 109 of the shank into the adjacent end of the recess 105. The hole 108 is obliquely disposed and directed toward the long axis of the counterbore 103 of the shank.

The shape and size of an actual coolant passage 110 is established by a thread 111 which is laid in the recess 105 with opposite ends 112 and 113 of indiscriminate length exposed. The end 112 is pulled through the oblique hole 108 and the end 113 pulled outwardly of the groove 106. A bedding material 114 is then packed in the recess 105 around the thread 111.

An appropriate material for the thread may be wax or a wax-like material of relatively low melting point. The bedding material is preferably a material of relatively higher melting point and which at ambient temperature is relatively hard and capable of being machined off to a surface flush with the exterior surface of the shank. An epoxy resin with or without a filler of powdered metal may be used.

After the thread has been embedded as described, the shank is heated sufficient to liquify the material of the thread, which is permitted to flow out of the recess until it leaves a clear hole through the recess 105, which becomes the coolant passage 110.

Although a wax-like thread of the kind described may be found to be preferable, it should be appreciated that the thread material may be of some other type sufficient to hold its shape while being embedded but which is capable of being subsequently caused to disintegrate and expelled from the recess to clear the coolant passage.

While particular embodiments of the present invention have been shown and described, it will be obvious to those skilled in the art that changes and modifications may be made without departing from the invention in its broader aspects and, therefore, the aim of the appended claims is to cover all such changes and modifications as fall within the true spirit and scope of the invention.

Having described the invention, what is claimed as new in support of Letters Patent is as follows:

1. In a coolant handling device for a tool guide for directing flow of a coolant toward the shaft and cutting edge of a tool wherein said device is in the nature of a coolant directing assembly comprising a body having attachment means for engagement with a conventional power tool, a passage in said body and a separate shank extending from the passage in said body, the shank having an axial bore for reception of a tool, a free end of said shank adapted to extend outwardly of said body and a captive end of said shank in engagement within said body, a method for forming a coolant directing passage means extending from the exterior of the body at the captive end of the shank and to an outlet at the free end of the shank comprising forming an axial hole through the body corresponding to the outside diameter of the shank for reception of the shank, forming a coolant supply passage extending from the exterior of the body into the axial bore, forming a recess in the wall of said shank having open ends extending between the captive end and the free end of the shank and parallel to the axial bore at a location spaced diametrically outwardly of the axial bore, lodging a thread-like member comprising a material of alterable consistency in said recess, securing said thread-like member in place with a mass of bedding material of relatively non-alterable consistency, subjecting said shank to a treatment capable of effecting alteration of the consistency of said thread-like material and incapable of effecting alteration of the mass of bedding material, removing the resulting thread-like material while of altered consistency from the recess in the shank to form a coolant directing passage means and then mounting the shank in the body with the exterior of the captive end of the shank in direct contact with the wall of the axial hole.

2. The method of claim 1 including using for the material of alterable consistency a material of relatively low melting point and a bedding material of relatively higher melting point and heating said shank to a temperature intermediate that of the low melting point and that of the relatively higher melting point until the material of low melting point is liquefied and then expelling the material of relatively lower melting point from the recess while in a liquefied condition.

3. The method of claim 1 including forming an annular distributing groove on the exterior of the shank at the captive end at the location of the coolant supply passage in the body and in communication with the recess.

4. The method of claim 1 including aligning the thread-like member within the bedding material at the free end of the recess in a direction toward the longitudinal axis of the shank.

5. The method of claim 1 including forming a discharge bore in the material of the free end of the shank between the recess and said free end with the bore being directed obliquely toward the longitudinal axis of the shank and extending the bedding material and the thread-like member through said discharge bore.

6. The method of claim 1 including forming a plurality of recesses at circumferentially spaced locations on the shank and lodging a thread-like member of the same alterable consistency in each recess.

7. The method of Claim 1 including forming a plurality of recesses at circumferentially spaced locations on the shank placing a thread-like member in each recess and aligning the thread-like member at the free end of each recess in an oblique converging direction toward the longitudinal axis of the shank.

8. The method of claim 1 including using a synthetic plastic resin as the bedding material.

9. The method of claim 1 including employing a synthetic plastic resin material as the bedding material and a material of the consistency of wax as the thread-like member.

10. In a coolant handling device for a tool guide for directing flow of coolant toward the shank and cutting edge of a tool wherein said device is in the nature of a coolant directing assembly comprising a body having attachment means for engagement with a conventional power tool and a shank extending from said body, the shank having an axial bore for reception of a tool, a wall with an exposed portion terminating in a free end adapted to extend outwardly of said body and a captive end in engagement with said body, a method for forming a coolant directing passage means extending from the body at the captive end of the shank to an outlet at the free end of the shank comprising forming a recess in the wall of the shank along a line parallel to and spaced radially from the axis of said coolant passage means and extending between the captive end and the free end of the shank, lodging a straight section of tubing in the recess extending throughout the length of the recess between an inlet end and an outlet end, and applying a bedding material to the recess and the section of tubing to anchor the tubing in the recess.

11. The method of claim 10 including forming a portion of the recess at the free end of the shank in an oblique direction toward the longitudinal axis of the shank and directing the outlet end of the tubing in a direction corresponding to the oblique direction of the bottom of the recess.

12. The method of claim 11 including reshaping the tubing at the outlet end adjacent that portion lying in the oblique direction in the form of a converging nozzle.

13. The method of claim 10 including forming the recess in the exposed wall of the shank extending to the free end of the shank.

14. The method of claim 10 including tapering the end of the recess at the free end of the shank in a radially inward direction and obliquely toward the central axis of the bore and then projecting the corresponding end of the tube into the tapered portion of the recess.

15. The method of claim 10 including forming a central bore hole in the body for reception of the captive end of the shank, forming a coolant supply passage from the exterior of the body to the central bore hole and extending the coolant directing passage means of the shank to a position of direct communication with the coolant supply passage.

* * * * *